US007202653B2

(12) United States Patent
Pai

(10) Patent No.: US 7,202,653 B2
(45) **Date of Patent: *Apr. 10, 2007**

(54) HIGH EFFICIENCY POWER CONVERTER

(75) Inventor: Chung-Lung Pai, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 28 days.

This patent is subject to a terminal disclaimer.

(21) Appl. No.: 11/084,087

(22) Filed: Mar. 21, 2005

(65) Prior Publication Data

US 2005/0213354 A1 Sep. 29, 2005

(30) Foreign Application Priority Data

Mar. 25, 2004 (TW) .............................. 93108204 A

(51) Int. Cl.
*G05F 1/40* (2006.01)

(52) U.S. Cl. ........................................ 323/284; 307/31

(58) Field of Classification Search ........ 323/282–288, 323/272–274, 268, 224, 222; 363/101, 89, 363/16

See application file for complete search history.

(56) References Cited

U.S. PATENT DOCUMENTS 5,481,178 A * 1/1996 Wilcox et al. .............. 323/287
5,714,863 A * 2/1998 Hwang et al. .............. 320/166

* cited by examiner

*Primary Examiner*—Rajnikant B. Patel
(74) *Attorney, Agent, or Firm*—Rosenberg, Klein & Lee

(57) ABSTRACT

A high efficiency power converter comprises a boost converter for converting an input voltage to a first voltage on a first output, a buck converter for converting the input voltage to a second voltage on a second output, a linear regulator for converting the first voltage to a third voltage on the second output when the second voltage is lower than a first threshold, and a voltage detector for detecting the input voltage for preventing a reverse current flowing from the second output to the buck converter when the input voltage is lower than a second threshold.

5 Claims, 3 Drawing Sheets

HIGH EFFICIENCY POWER CONVERTER

FIELD OF THE INVENTION

The present invention is related generally to power conversion and more particularly, to a high efficiency power converter.

BACKGROUND OF THE INVENTION

For portable electronic products, alkaline and lithium batteries are generally used as the power sources. However, the battery has a tendency of gradually decreased voltage as the use time increases. To retain a stable output voltage, a two-stage power converter is typically employed, by which the input voltage supplied by the battery or batteries is stepped up first and then stepped down to the desired level.

FIG. 1 shows a conventional two-stage power converter 10, which comprises a boost converter 12 cascaded with a buck converter 14. Generally, the battery voltage $V_{bat}$ is provided by two alkaline batteries or one lithium battery. The battery voltage $V_{bat}$ is converted by the boost converter 12 to generate a first output voltage $V_{out1}$, and then the first output voltage $V_{out1}$ is converted by the buck converter 14 to generate a second output voltage $V_{out2}$. Unfortunately, the boost converter 12 and the buck converter 14 each has the conversion efficiency of about 90%, and therefore, the total efficiency of the two-stage power conversion is only about 81% or less. Namely, the overall efficiency of the two-stage power converter is reduced due to the cascaded conversion.

Therefore, it is desired a high efficiency power converter.

SUMMARY OF THE INVENTION

One object of the present invention is to provide a high efficiency power converter.

In a high efficiency power converter, according to the present invention, a boost converter is used to convert an input voltage to a first voltage on a first output, a buck converter is used to convert the input voltage to a second voltage on a second output, and a linear regulator is coupled between the first and second outputs to convert the first voltage to a third voltage on the second output when the second voltage is lower than a first threshold. The buck converter comprises a switch coupled between the input voltage and the second output, an error amplifier for generating an error signal in response to a difference between the voltage on the second output and a reference voltage, and a logic circuit responsive to the error signal for switching the switch. A voltage detector is further comprised in the power converter to detect the input voltage, so as to prevent a reverse current flowing from the second output to the buck converter when the input voltage is lower than a second threshold.

Since the power conversion is implemented by single conversion stage, either with the boost converter or with the buck converter, in association with the linear regulator to generate the third voltage in replace of the second voltage when the second voltage is lower than the first threshold, the overall efficiency of the power conversion is improved up to about 90% or more.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
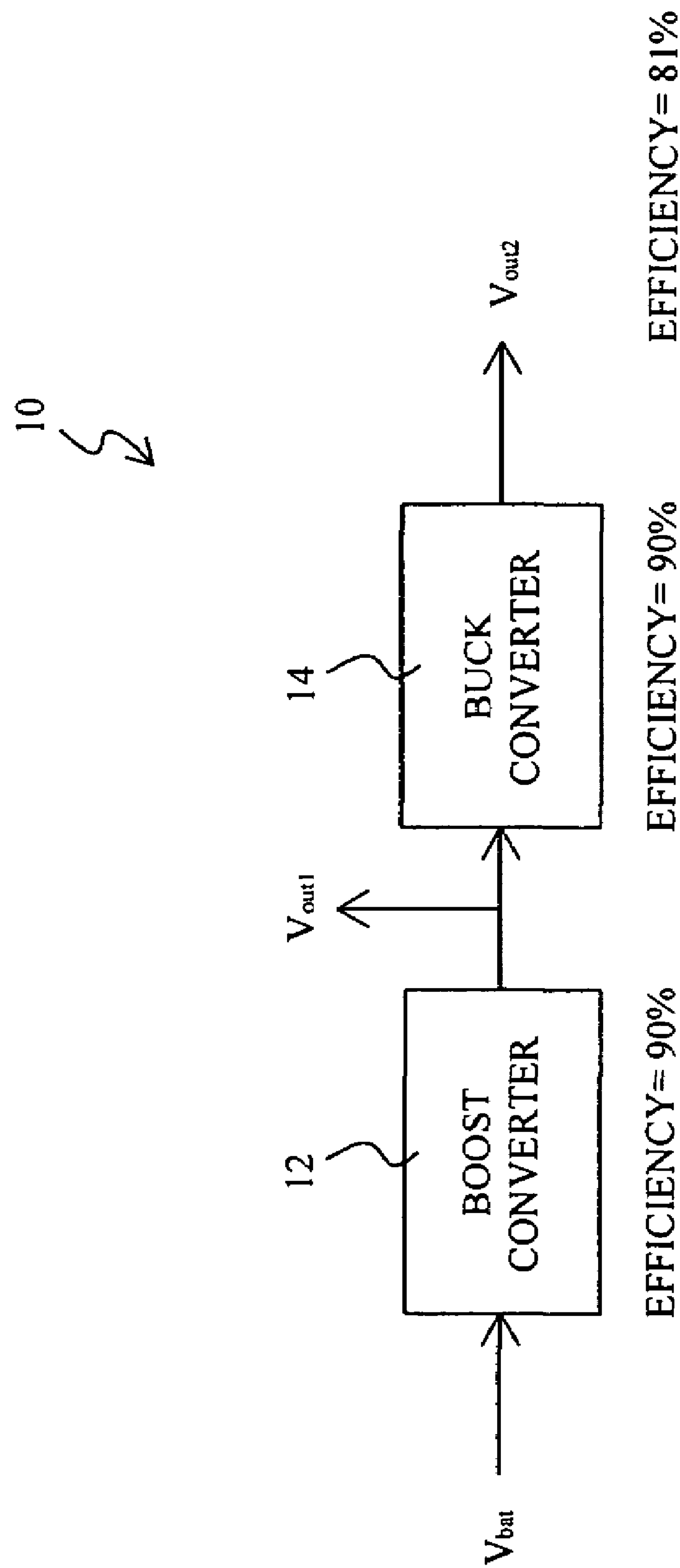
FIG. 1 shows a simplified schematic illustration of a conventional two-stage power converter.
Figure 2:
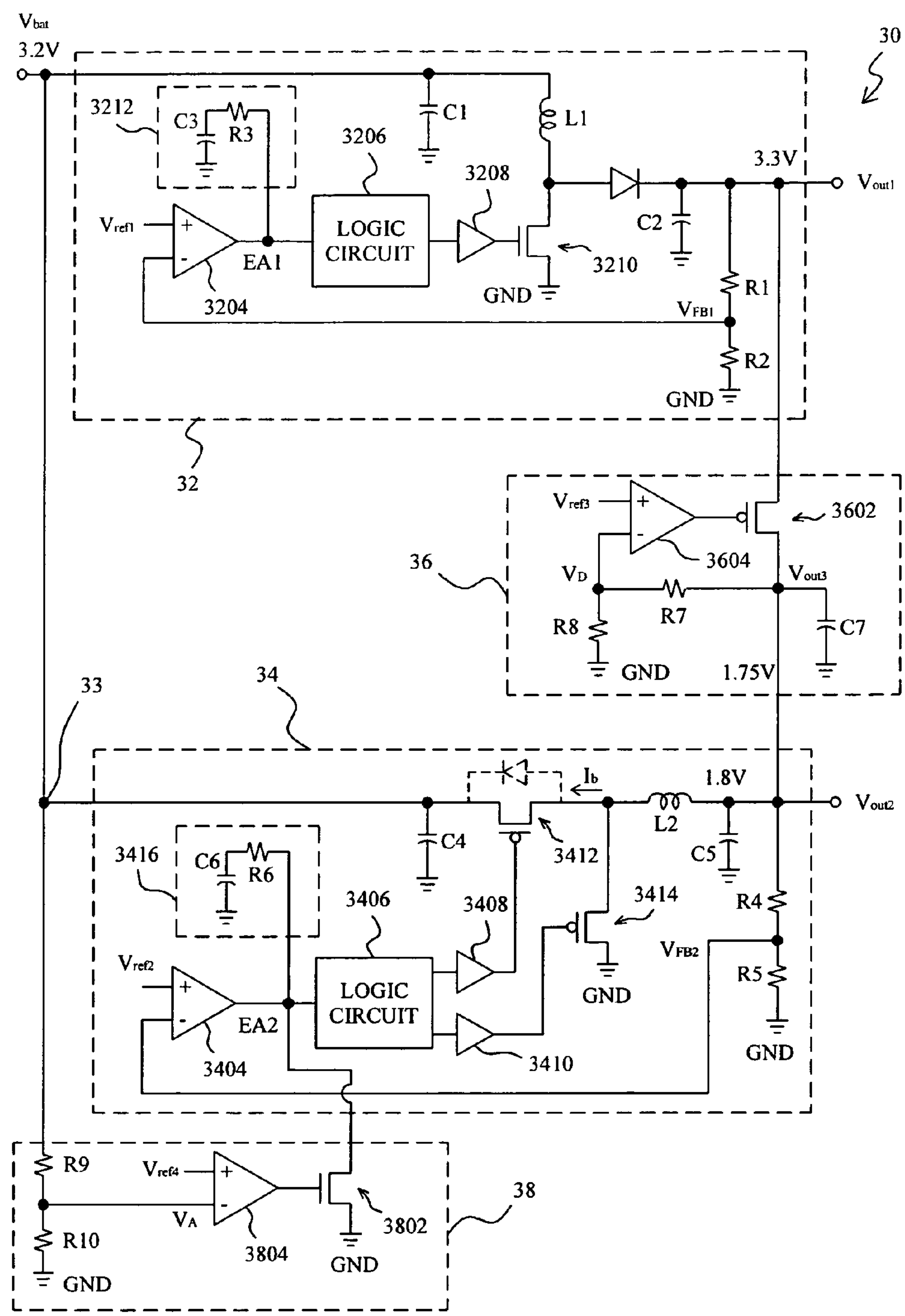
FIG. 2 shows a power converter of the present invention having two alkaline batteries as its power source.

FIG. 2 shows a power converter 30, according to the present invention, that uses two alkaline batteries as its power source. In the power converter 30, the input voltage $V_{bat}$ supplied by the two alkaline batteries is 3.2V, and is converted by a boost converter 32 to generate a first voltage of 3.3V on a first output $V_{out1}$. The level of the first voltage $V_{out1}$ is set up by selecting the parameters of the inductor L1, capacitors C1 and C2, and resistors R1 and R2 in the boost converter 32. In the boost converter 32, the resistors R1 and R2 connected in series between the first output $V_{out1}$ and ground GND serve as a voltage divider for dividing the first voltage $V_{out1}$ to generate a feedback voltage $V_{FB1}$ for an error amplifier 3204 to compare with a reference voltage $V_{ref1}$, so as to generate an error signal EA1 upon which a logic circuit 3206 will generate a signal to switch a transistor 3210 by a driver 3208 to regulate the first voltage $V_{out1}$ at 3.3V. The error signal EA1 may be compensated additionally by a compensation network 3212 consisting of a capacitor C3 and a resistor R3 in such a manner that the phase of the error signal EA1 will not shift. The input voltage $V_{bat}$ of 3.2V is also provided to a buck converter 34 to generate a second voltage of 1.8V on a second output $V_{out2}$. The level of the second voltage $V_{out2}$ is set up by selecting the parameters of the inductor L2, capacitors C4 and C5, and resistors R4 and R5 in the buck converter 34. In the buck converter 34, the resistors R4 and R5 connected in series between the second output $V_{out2}$ and ground GND serve as a voltage divider for dividing the second voltage $V_{out2}$ to generate a feedback voltage $V_{FB2}$ for an error amplifier 3404 to compare with a reference voltage $V_{ref2}$, so as to generate an error signal EA2 upon which a logic circuit 3406 will generate a signal to switch transistors 3412 and 3414 by drivers 3408 and 3410 to regulate the second voltage $V_{out2}$ at 1.8V. Likewise, the error signal EA2 may be compensated by a compensation network 3416 consisting of a capacitor C6 and a resistor R6 in such a manner that the phase of the error signal EA2 will not shift. In this embodiment, the buck converter 34 is designed with a synchronous voltage converter scheme for illustration, however the power converter of the present invention may be implemented with asynchronous buck converter in some other embodiments as well.

As the use time of the two alkaline batteries increases, the input voltage $V_{bat}$ reduces gradually, and until the input voltage $V_{bat}$ is lower than 1.8V, the second voltage $V_{out2}$ generated by the buck converter 34 could not be regulated at 1.8V any more. For the power converter 30 still to operate normally when the input voltage $V_{bat}$ is lower than 1.8V, a low dropout (LDO) regulator 36 or other type of linear regulator is further coupled between the first output $V_{out1}$ and the second output $V_{out2}$. In the LDO regulator 36, resistors R7 and R8 are connected in series between the second output $V_{out2}$ and ground GND to serve as a voltage divider for dividing the voltage on the second output $V_{out2}$ to generate a voltage $V_D$ for a comparator 3604 to compare with a reference voltage $V_{ref3}$, and when the second voltage $V_{out2}$ generated by the buck converter 34 is lower than a threshold, for example 1.75V, the comparator 3604 generates a signal to turn on a transistor 3602 connected between the first output $V_{out1}$ and the second output $V_{out2}$. After the transistor 3602 turns on, the first voltage $V_{out1}$ of 3.3V generated by the boost converter 34 is converted by the LDO regulator 36 to generate a third voltage $V_{out3}$ of 1.75V on the second output $V_{out2}$. As a result, the power converter 30 may operate normally even in the case that the input voltage $V_{bat}$ supplied by the two alkaline batteries decreases under the threshold 1.8V, and therefore the overall efficiency of the power converter 30 is improved.

On the other hand, as the use time of the two alkaline batteries increases, the input voltage reduces gradually until the input voltage $V_{bat}$ lower than the voltage on the second output $V_{out2}$, due to the parasitic diode of the transistor 3412, as shown by dashed line in FIG. 2, a reverse current $I_b$ will be generated to flow from the second output $V_{out2}$ toward the input 33 of the buck converter 34 if the transistor 3412 is on. To prevent the generation of the reverse current $I_b$, a voltage detector 38 is coupled to the input 33 and the buck converter 34 for detecting the input voltage $V_{bat}$. In the voltage detector 38, resistors R9 and R10 are connected in series between the input 33 and ground GND to serve as a voltage divider for dividing the input voltage $V_{bat}$ to generate a voltage $V_A$ for a comparator 3804 to compare with a reference voltage $V_{ref4}$. When the input voltage $V_{bat}$ is lower than a threshold, for example 1.9V, the comparator 3804 will generate a signal to turn on a transistor 3802 connected between the output of the error amplifier 3404 in the buck converter 34 and ground GND to direct the error signal EA2 to ground GND, such that the transistor 3412 turns off, and hence the reverse current $I_b$ will not be generated.

Figure 3:
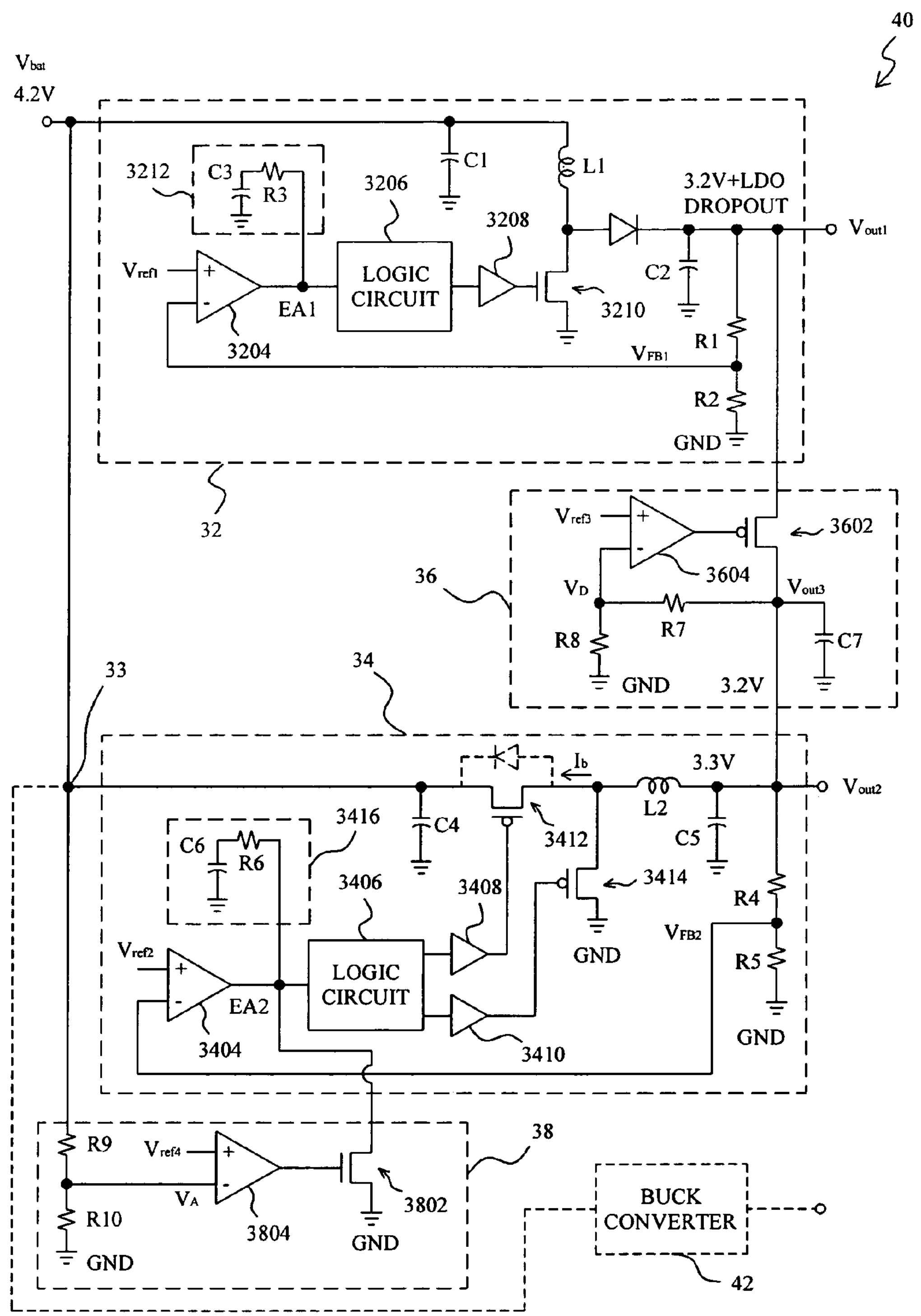
FIG. 3 shows a power converter of the present invention having a lithium battery as its power source.

FIG. 3 shows a power converter 40 using a lithium battery as its power source. In this embodiment, the input voltage $V_{bat}$ supplied by the lithium battery is 4.2V, and the boost converter 32, the buck converter 34, the LDO regulator 36 and the voltage detector 38 that are employed in the power converter 30 shown in FIG. 2 are also comprised hereof. By selecting the parameters of the inductor L1, the capacitors C1 and C2 and the resistors R1 and R2, the voltage on the first output $V_{out1}$ is set to be the sum of 3.2V and the minimum LDO dropout voltage for the LDO regulator 36 to operate in higher efficiency region. The error amplifier 3204 compares the feedback voltage $V_{FB1}$ proportional to the first voltage $V_{out1}$ with the reference voltage $V_{ref1}$ to generate the error signal EA1, and the logic circuit 3206 responds to the compensated signal of the error signal EA1 compensated by a compensation network 3212 to switch the transistor 3210 to regulate the first voltage $V_{out1}$ at 4.2V.

Similarly, in the buck converter 34, by selecting the parameters of the inductor L2, the capacitors C4 and C5 and the resistors R4 and R5, the input voltage $V_{bat}$ is converted to a second voltage of 3.3V at the second output $V_{out2}$, the error amplifier 3404 compares the feedback voltage $V_{FB2}$ proportional to the second voltage $V_{out2}$ with the reference voltage $V_{ref2}$ to generate the error signal EA2, and the logic circuit 3206 responds to the compensated signal of the error signal EA2 compensated by a compensation network 3416 to switch the transistors 3412 and 3414 to regulate the second voltage $V_{out2}$ at 3.3V.

In the LDO regulator 36, the comparator 3604 compares the voltage $V_D$ proportional to the second voltage $V_{out2}$ with the reference voltage $V_{ref3}$ to generate a signal to switch the transistor 3602. When the second voltage $V_{out2}$ generated by the buck converter 34 is lower than the threshold 3.2V, the comparator 3604 will turns on the transistor 3602, so as to convert the first voltage of 4.2V generated by the boost converter 32 to a third voltage $V_{out3}$ of 3.2V on the second output $V_{out2}$. Therefore, the power converter 40 may operate normally as well.

In the voltage detector 38, the comparator 3804 compares the voltage $V_A$ proportional to the input voltage $V_{bat}$ with the reference voltage $V_{ref4}$ to generate a signal to switch the transistor 3802. When the input voltage $V_{bat}$ is lower than the threshold 3.3V, the output generated by the comparator 3804 will turn on the transistor 3802 to direct the error signal EA2 to ground GND. The transistor 3412 is thus turned off to prevent the generation of a reverse current $I_b$.

In addition, some other embodiments may further comprise another buck converter 42 connected with the input voltage $V_{bat}$ for other requirements, as shown by dashed line in FIG. 3.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A high efficiency power converter comprising:

a boost converter for converting an input voltage to a first voltage on a first output;

a buck converter concurrently operable with the boost converter to convert the input voltage to a second voltage on a second output, the second voltage being different in value from the first voltage;

a linear regulator coupled between the first and second outputs for converting the first voltage to a third voltage on the second output when the second voltage is lower than a first threshold; and a voltage detector for detecting the input voltage for preventing a reverse current flowing from the second output to the buck converter when the input voltage is lower than a second threshold.

2. The power converter of claim 1, wherein the buck converter comprises:

an error amplifier for generating an error signal in response to a difference between the voltage on the second output and a reference voltage;

a switch coupled between the input voltage and the second output; and a logic circuit responsive to the error signal for switching the switch.

3. The power converter of claim 2, wherein the buck converter further comprises a compensation network for compensating the error signal.

4. The power converter of claim 2, wherein the voltage detector comprises:

a voltage divider for dividing the input voltage to thereby generate a fourth voltage;

a comparator for comparing the fourth voltage with a second reference voltage to thereby generate a comparison signal; and a second switch controlled by the comparison signal for directing the error signal to a reference ground.

5. The power converter of claim 1, wherein the linear regulator comprises an LDO regulator.

* * * * *